INVENTOR
WILLIAM F. MOON
BY Rice and Rice
ATTORNEYS

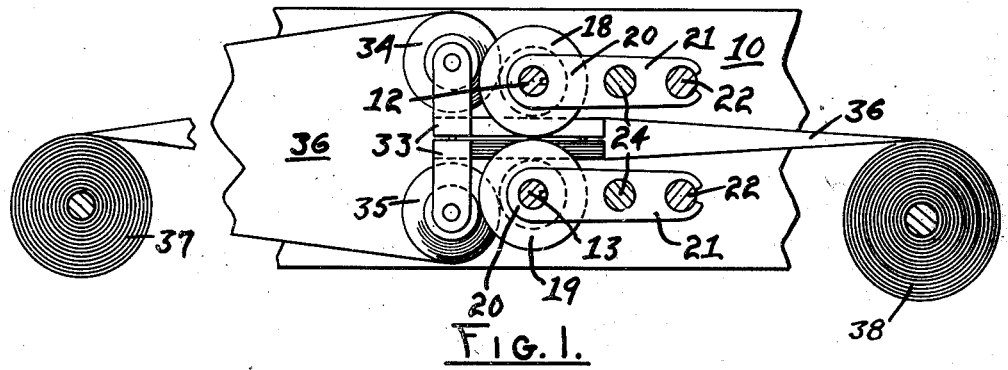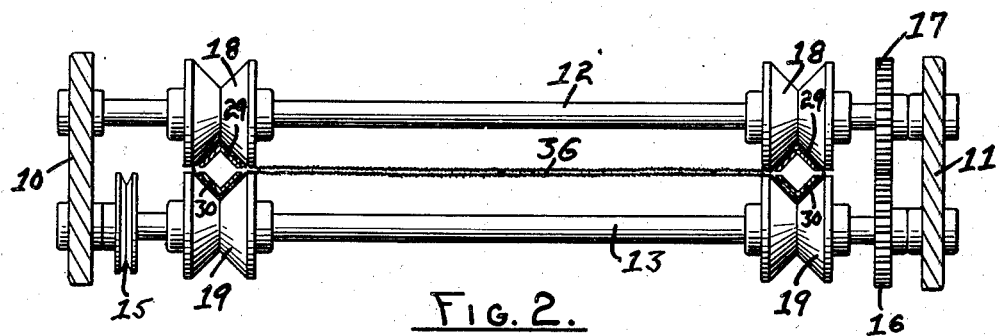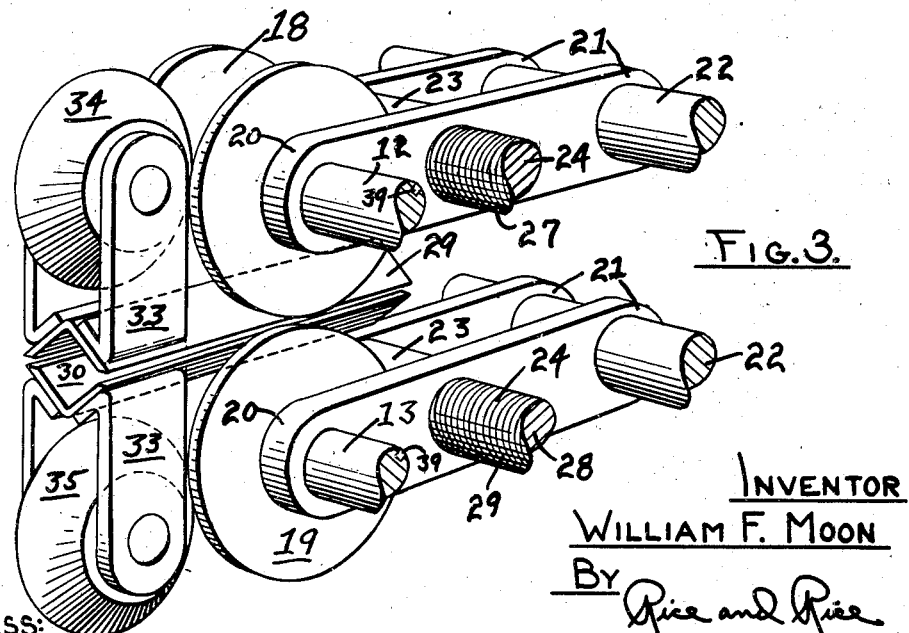

WITNESS:
Lennie L. Parker

Patented Feb. 4, 1947

2,415,185

UNITED STATES PATENT OFFICE 2,415,185

STRETCHING MACHINE

William F. Moon, Grand Rapids, Mich.

Application March 13, 1946, Serial No. 654,191

3 Claims. (Cl. 26—55)

The present invention relates to stretching machines and more particularly to machines for stretching widths of lengths of tubular fabric.

The primary objects of the instant invention are to provide a machine of the general character above indicated which is highly efficient in its intended use; to provide such a machine which is relatively simple in construction; to provide such a machine which may be conveniently operated; and, to provide such a machine which is reasonably economical in manufacture.

An illustrative embodiment of the invention is shown in the accompanying drawings, wherein:

Figure 1 is a fragmentary longitudinal sectional view of the stretching machine;

Figure 2 is a fragmentary cross-sectional view thereof;

Figure 3 is an enlarged fragmentary perspective view of one inner forward side of the machine;

Figure 4:
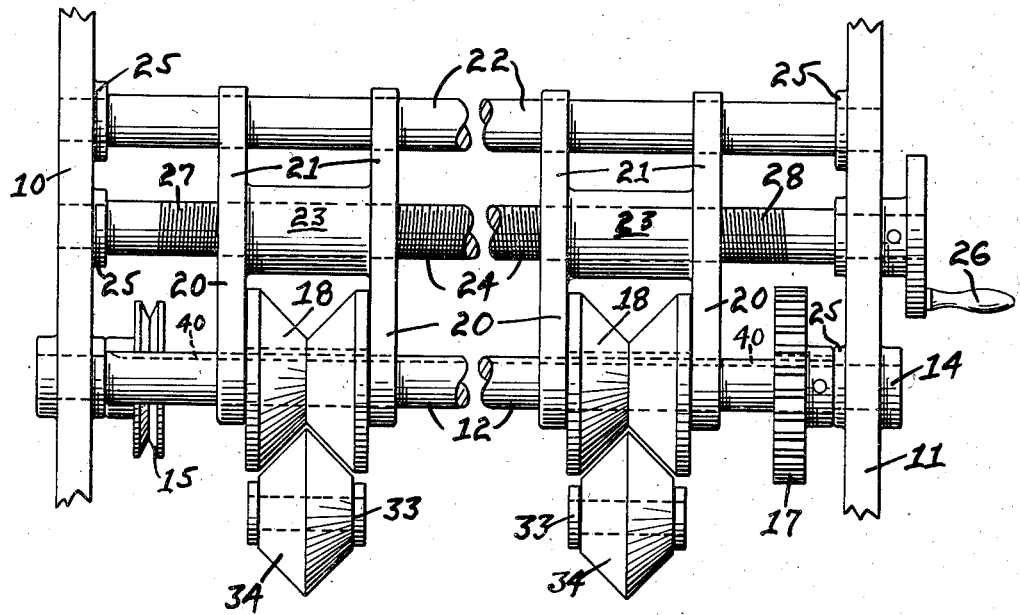
Figure 4 is an enlarged fragmentary top plan view of the forward side.

Referring then to the drawings wherein like parts of the machine shown are designated by the same numerals in the several views, the same is provided with a pair of horizontally disposed laterally spaced elongated frame members 10, 11 and a pair of transversely disposed vertically spaced shafts 12, 13 each provided with a longitudinal groove 39 are each rotatable within journal bearings 14 of the pair of spaced frame members 10, 11.

The shaft 13 is here shown as provided with a V-shaped pulley wheel 15 secured adjacent one end thereof and a gear wheel 16 secured adjacent its other end is in mesh with a gear wheel 17 secured adjacent the end of the shaft 13 above the gear wheel 15 whereby rotation of the shaft 13 by means of power transmitted to the pulley wheel 15 effects a counter rotation of the shaft 12.

A pair of spaced V-shaped rollers 18, 19, each provided with a spline 40 slidably secured within the groove 39 of each shaft 12, 13 are each rotatable between a pair of arms 20 of an H-shaped member slidably and rotatably embracing each shaft 12, 13 and whose opposite pair of arms 21 slidably embrace a shaft 22 secured between the frame members 10, 11 rearwardly of each shaft 12, 13.

The transverse portion 23 of each H-shaped member 21 is provided with a longitudinal screw threaded bore and a shaft 24 rotatably mounted within journal bearings 25 of the pair of spaced frame members 10, 11 rearwardly of each shaft 12, 13 by means of a crank 26 is provided with left hand screw threads 27 adjacent one end thereof in mesh with the screw threaded bore of one H-shaped member 21 and with right hand screw threads 28 adjacent its other end in mesh with the screw threaded bore of its companion H-shaped member whereby each companion pair of rotatable V-shaped rollers 18, 19 may be drawn one toward the other or be moved one away from the other.

Figure 5:
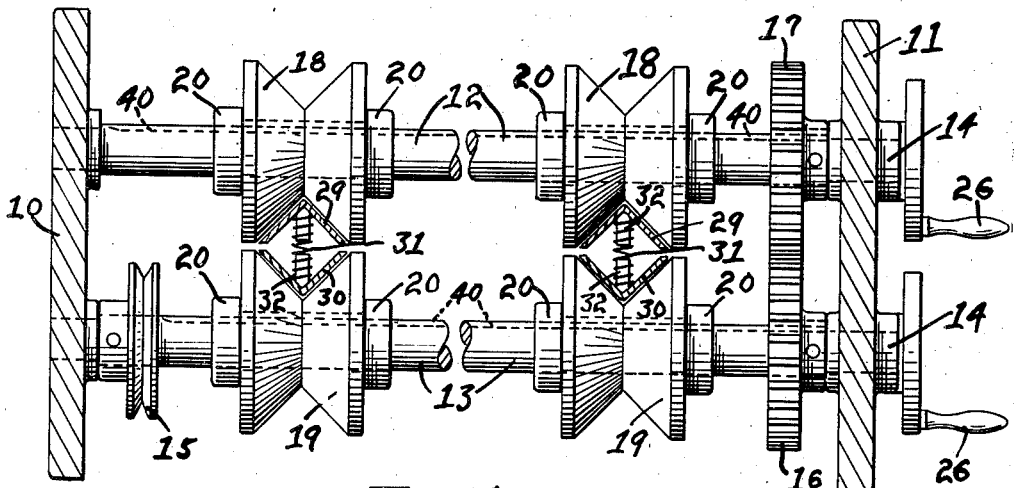
Figure 5 is a view similar to Figure 2 but on an enlarged scale.
Figure 6:
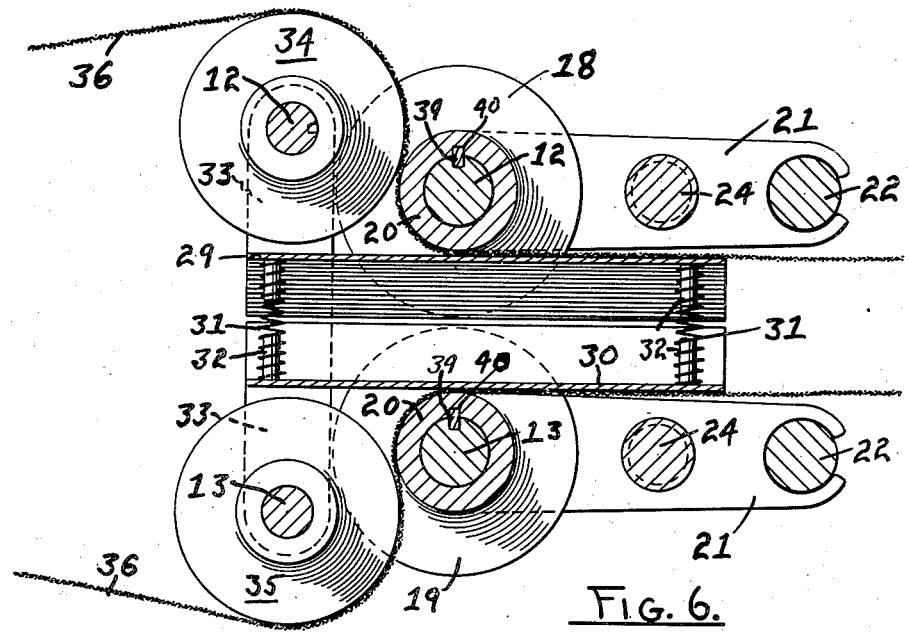
Figure 6 is a view similar to Figure 1 but on an enlarged scale.
Figure 7:
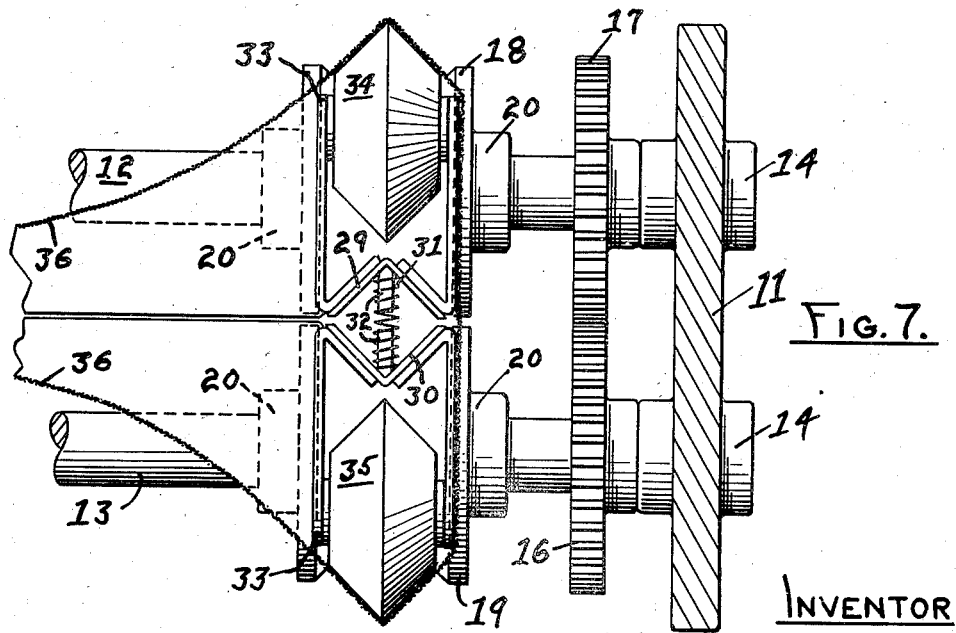
Figure 7 is a fragmentary cross-sectional view of the stretching machine similar to Figures 2 and 5 but on a larger scale.

A pair of separable mandrels 29, 30 adapted for insertion between each proximate pair of V-shaped rollers 18, 19 are V-shaped and inverted V-shaped in form and are maintained in spread relation to each other by means of helical expansion springs 31 loosely embracing pairs of co-axial pins 32 projecting toward each other transversely of the trough portion of each pair of separable mandrels 29, 30 adjacent their respective ends as best seen in Figures 5–7, and each separable portion 29, 30 of the pair of separable mandrels is provided with a transversely secured U-shaped bracket 33 adjacent an end thereof between whose arms is a wedge shaped rotatable roller 34, 35 each adapted to be respectively rotated by a V-shaped rotating roller 19, 20 when a length of tubular fabric 36 is interposed therebetween, as best viewed in Figures 1, 6 and 7.

Either roller 34, 35 may be stationary or in the form of a ball or in the form of a bulbous member permitting slippage of the fabric 36 thereover since it is necessary to have but one feed roller along opposite sides of the length of tubular fabric being drawn through and stretched by the machine.

Operation

In operation, the separable mandrels 29, 30 and their fixed rotatable rollers 34, 35 are withdrawn from the machine and each pair inserted within an open end of an elongated length of fabric, tubular in cross section, after which the predetermined width of the fabric to be stretched is fixed by rotating the cranks 26 governing the position of the V-shaped rollers 18, 19 on their respective shafts 12, 13.

Each set of separable mandrels is thereupon inserted between a companion pair of V-shaped rollers, 18, 19 after which power, actuating the pulley wheel 15, effects rotation of the rollers 18, 19 to draw the fabric from the spool 37 through the machine and permit it to be wound on the spool 38, as best viewed in Figures 1, 2, 6 and 7, and thus stretch the material to the predetermined width.

It will thus be seen that the machine herein shown and described is highly efficient in its intended use, may be conveniently operated, is simple in construction, and is reasonably economical in manufacture, and while but one specific embodiment of the invention has been herein shown and described, it will be understood that certain details of the construction shown may be altered or omitted without departing from the spirit of the invention as the same is defined in the following claims.

I claim:

1. In a machine of the class described, a pair of parallelly disposed vertically spaced oppositely rotatable shafts, each provided with a pair of spaced V-shaped rollers rotatable with their shaft and adjustably slidable thereon toward and away from each other, a non-circular mandrel adapted for insertion between each companion pair or rollers adapted to be inserted therebetween and having a pair of lateral oppositely disposed members, one of said members being a wedge shaped roller adapted to be rotated by a V-shaped roller during its rotation in instances wherein a length of tubular fabric is engaged therebetween and drawn thereby, and means for rotating said shafts.

2. In a machine of the class described, a pair of parallelly disposed vertically spaced oppositely rotatable shafts, each provided with a pair of spaced V-shaped rollers rotatable with their shaft and adjustably slidable thereon toward and away from each other, a non-circular mandrel adapted for insertion between each companion pair of rollers adapted to be inserted therebetween and having a pair of lateral oppositely disposed wedge shaped rollers, each adapted to be rotated by a V-shaped roller of a companion pair of said rollers during their rotation in instances wherein a length of tubular fabric is engaged therebetween and drawn thereby, and means for rotating said shafts.

3. In a machine of the class described, a pair of parallelly disposed vertically spaced oppositely rotatable shafts, each provided with a pair of spaced V-shaped rollers rotatable with their shaft and adjustably slidable thereon toward and away from each other, a longitudinally separable cross-sectionally expensible mandrel adapted for insertion between each companion pair of rollers and having a pair of lateral oppositely disposed wedge shaped rollers each adapted to be rotated by a V-shaped roller of a companion pair of said rollers during their rotation in instances wherein a length of tubular fabric is engaged therebetween and drawn thereby, and means for rotating said shafts.

WILLIAM F. MOON.